(12) United States Patent
Otaki

(10) Patent No.: US 6,317,261 B1
(45) Date of Patent: Nov. 13, 2001

(54) PHASE CONTRAST OBSERVATION DEVICE

(75) Inventor: Tatsuro Otaki, Edogawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/345,164

(22) Filed: Jun. 30, 1999

(30) Foreign Application Priority Data

Jun. 30, 1998 (JP) ................................. 10-198163

(51) Int. Cl.[7] .................................................. G02B 21/06
(52) U.S. Cl. ..................... 359/387; 359/368; 359/370; 359/371; 359/385; 359/386
(58) Field of Search .................................. 359/368, 370, 359/371, 385, 386, 387

(56) References Cited

U.S. PATENT DOCUMENTS

| | | | |
|---|---|---|---|
| 5,708,526 | 1/1998 | Stankewitz | 359/386 |
| 5,969,853 | * 10/1999 | Takaoka | 359/370 |

OTHER PUBLICATIONS

"Some Improvements in the Phase Contrast Microscope," by K. Yamamoto and A. Taira, Journal of Microscopy, vol. 129, Pt. 1, pp. 49–62, January 1983.

* cited by examiner

Primary Examiner—Cassandra Spyrou
Assistant Examiner—Craig Curtis

(57) ABSTRACT

A phase contrast observation device for observing a phase object (O), and phase apertures for same. The device comprises, in order along an optical axis (AX), a light source (LS) capable of providing light (L), an illumination optical system (G2 and G3) for condensing the light and illuminating the object, an aperture stop (AP) having an aperture (AO) therein, arranged in the illumination optical system, an objective lens system (G2 and G3) for converging light from the illuminated object and forming an image of the object. The device also includes one of a number of novel phase apertures (Ph1–Ph4) arranged at a position inside said objective lens conjugate to the aperture stop. The phase apertures of the present invention allow for high-contrast and low-contrast imaging regardless of the phase content of the object.

11 Claims, 8 Drawing Sheets

PHASE CONTRAST OBSERVATION DEVICE

FIELD OF THE INVENTION

The present invention pertains to a phase contrast observation device, more particularly, to a phase contrast microscope that allows for observing a transparent object, such as biological specimen, without the need to stain the object.

BACKGROUND OF THE INVENTION

In phase contrast microscopy, an object is illuminated by an illumination optical system defined by an aperture stop located at the pupil position of the illumination optical system. A phase plate, providing a phase modulation, is arranged inside an objective lens at a location conjugate with the pupil of the illumination optical system. Then, the phase difference of light introduced by the object (phase object) is converted into a difference in light intensity. Therefore, the phase difference of the object is visualized as light and shade of the image (i.e., contrast), and can be observed. The phase contrast microscope was invented by Fritz Zernike in 1935, and is described in chapter 8.6 of the textbook "Principles of Optics (Sixth Edition)," by M. Born and E. Wolf, Pergamon Press, 1980.

The principle of the phase contrast microscope will be explained. With reference to FIG. 1, prior art phase contrast microscope 10 comprises, in order along an optical axis AX, a light source LS capable of emitting light L, an aperture stop AP arranged at a pupil plane P1 and having an annular opening (aperture) AO (FIG. 2), a condenser lens G1 having a front focal point F positioned on-axis at pupil plane P1, an object stage OS for supporting an object O to be observed, a first objective lens G2 having a rear focal point F' positioned on-axis, a phase plate Ph0 arranged at rear focal point F' and optically conjugate to aperture AP (FIG. 3), a second objective lens G3, and an image plane IP. First and second objective lenses G2 and G3 constitute an objective optical system. Phase plate Ph0 has an opening (aperture) AO0 similar to aperture opening AO, and also has a phase film PP thereon covering annular opening AO0. Phase film PP provides a phase difference of a quarter wavelength to light transmitted therethrough. Also, phase plate Ph0 has the same shape as phase film PP, and has an absorbing film which reduces the amount of transmitted light.

The operation of phase contrast microscope 10 is now explained. Illumination light L of wavelength $\lambda$ is emitted from light source LS and passes through annular opening AO in ring aperture AP. The latter determines the amount and nature of llumination of object O. Objective lenses G2 and G3 collect the light transmitted through object O and form an image of the object on object plane IP.

Light L is diffracted upon passing through object O and is thereby separated into a direct (undiffracted) light beam L1 and a $\pm 1^{st}$ order diffracted light beam L2. Light beams L1 and L2 then pass through phase plate Ph0. Phase film PP covers aperture opening AOD, which changes the phase of light beam L1 by a quarter of the wavelength ($\lambda/4$) relative to diffracted light beam L2. Light beam L1, with its phase advanced by ($\lambda/4$) interferes destructively with diffracted light beam L2 at image plane IP. On the other hand, light L having passed through a part of object O having no phase-altering properties does not produce diffracted light, and takes part in the background of direct light beam L1. Therefore, the phase difference of object O can be observed as light and shade in the image. Moreover, the amplitude of $\pm 1^{st}$ order diffracted light L2 can be expressed as a Bessel function $J_1(B)$. According to the intensity $J_1(B)^2$ of the diffracted light varying in accordance with the amount of the phase difference, a transmittance-modulation film, such as a neutral density film ND reducing the amount of transmitted light, is applied to the phase film PP. If the amplitude of direct light beam L1 is made equal to that of the diffracted light beam L2 with the help of neutral density transmittance-modulation film ND, the phase object can be observed with maximum intensity contrast against the background.

According to prior art contrast microscope 10 described above, if the amount of the phase difference of the object is small, a high detection sensitivity to the amount of phase difference, using low transmittance of direct light beam L1, is utilized. This is referred to as a high-contrast type microscope, or high contrast imaging. In this instance, the transmittance of the modulation film applied on phase film PP is about 0.1 to 0.25. In the case of a high-contrast imaging, an object having a small amount of phase difference can be easily observed. However, when an object having large amount of phase difference is observed, the ratio of the amplitude of the direct light to that of the diffracted light is reversed, and a reverse contrast image is formed. Therefor, a fringe-shaped blurring of light in accordance with the phase difference or structure of the object is formed around the image of the object. The phenomenon is called "halo." If halo is produced, good observation of the object is disturbed. Moreover, there is good possibility of misidentification of structure in the object.

When an object having a large amount of phase difference is observed, a low-contrast type phase contrast microscope having high transmittance of the direct (undiffracted) light beam is utilized to avoid producing halo. In such a microscope, it is desirable that the transmittance of transmittance-modulation film ND applied on phase film PP is on the order of 0.25 to 0.50. In a low-contrast type phase contrast microscope, instead of producing halo, other problems occurs. For example, when observing an object having small amount of phase difference, it is difficult to get a good image because of low image contrast.

In addition to the problems mentioned above, when an object is observed with white light using a phase contrast microscope, further problems arise. For example, with reference to FIG. 4, consider a phase object 11 having an interior medium width t and a refractive index n1, surrounded by a medium of refractive index n2. When phase object 11 is observed with a phase-contrast microscope, although refractive index n1 varies in accordance with wavelength, the refractive index is considered to be approximately constant within a normal extent of dispersion. The optical path length inside of phase object 11 can be expressed as n1×t. The amount of phase difference is expressed as (n1−n2)×t. Since the amount of phase difference is expressed in units of wavelength, the amount of phase difference produced in the same object is approximately inversely proportional to the wavelength. For example, an object having the amount of phase difference of 0.1$\lambda$ at a wavelength of 550 nm will produce the amount of phase difference of 0.14$\lambda$ at a wavelength of 400 nm. Therefore, there is a problem that even an object producing no halo at a given wavelength, such as 550 nm, produces halo at a different wavelength, such as 400 nm.

To solve this problem, the transmittance T1 of transmittance-modulation film ND is varied in accordance with the wavelength, from about 0.1 to about 0.4. For example, with reference also to FIG. 5, the transmittance $T_{ND}$ of the transmittance-modulation film ND at short wavelengths is made higher than that at long wavelengths. This allows the phase contrast microscope to work as low-contrast type at short-wavelengths and as high-contrast type at long wavelengths. Therefore, it is possible to mitigate the generation of a halo likely to be produced at the short-wavelength side. However, if the transmittance of the transmittance-modulation film ND is set high at short wavelengths, the spectral transmittance of the background of the image is changed, so that the background has color. For example, if the transmittance is high at short wavelengths, as shown in FIG. 5, the background becomes blue.

SUMMARY OF THE INVENTION

The present invention pertains to a phase contrast observation device, more particularly, to a phase contrast microscope that allows for observing a transparent object, such as biological specimen, without the need to stain the object.

The present invention has for its object, in the light of above-mentioned problems, to provide a phase contrast observation device always capable of making use of good contrast image despite an amount of phase difference inherent in an object.

Accordingly, a first aspect of the present invention is a phase contrast microscope for imaging an object having phase features. The microscope comprises, in order along an optical axis, a light source capable of providing light, an illumination optical system for condensing the light from said light source and illuminating the object, an aperture stop having an aperture therein, arranged in said illumination optical system, and an objective lens for converging light from the illuminated object and forming an image of the object. The microscope also includes one of a number of phase apertures according to the present invention, arranged at a position inside the objective lens at a position conjugate to the aperture stop.

A second aspect invention is a phase aperture suitable for use in the phase contrast microscope, described above. The phase aperture comprises, radially outwardly from a center, a first circular portion having a transmittance of 1, a second annular portion having a first transmittance, a third annular portion having a second transmittance, a fourth annular portion having said first transmittance, and a fifth annular portion having a transmittance of 1.

A third aspect of the invention is a phase aperture suitable for use in the phase contrast microscope, described above. The phase aperture comprises, radially outwardly from a center, a first circular portion having a transmittance of 1, a first annular portion having a first transmittance, a second annular portion having a second transmittance, a third annular portion having a third transmittance, a fourth annular portion having the second transmittance, a fifth annular portion having the first transmittance, and a sixth annular portion having a transmittance of 1.

DETAILED DESCRIPTION OF THE INVENTION

The present invention pertains to a phase contrast observation device, more particularly, to a phase contrast microscope that allows for observing a transparent object, such as biological specimen, without the need to stain the object.

Figure 6:
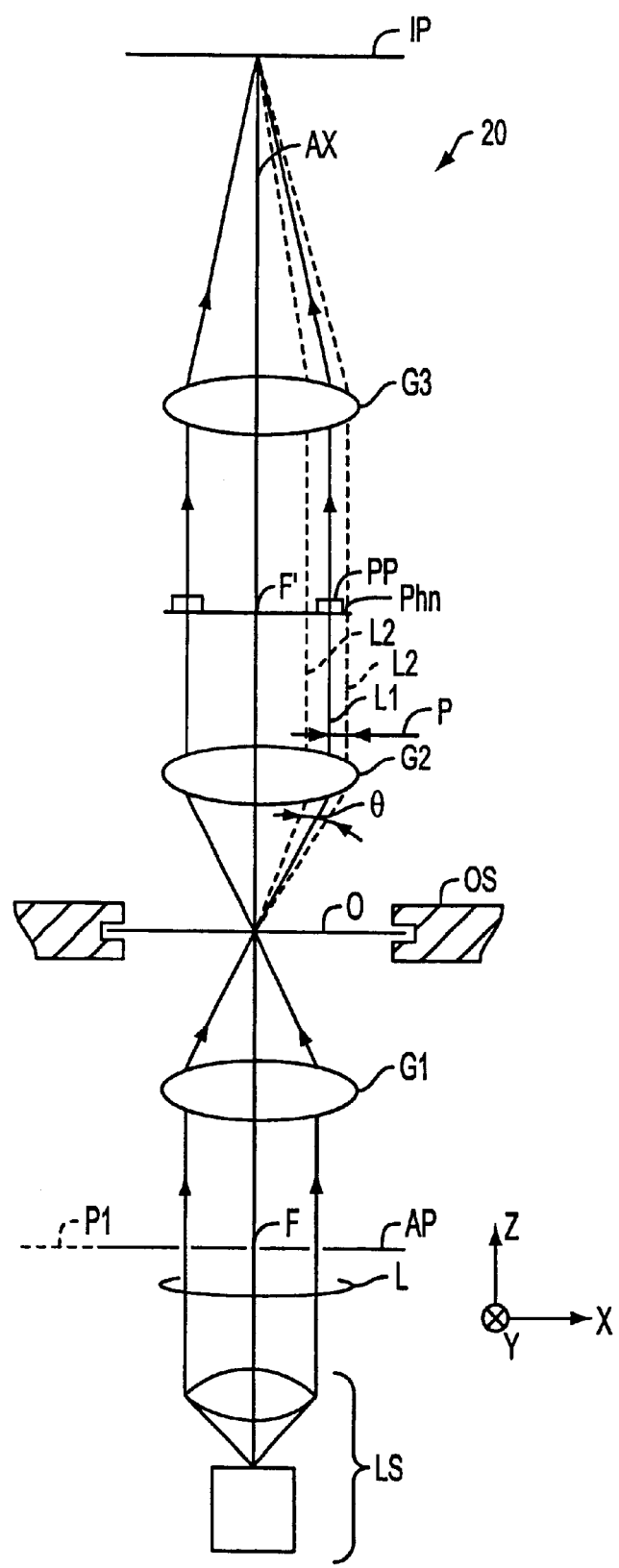
FIG. 6 is a schematic optical diagram of a phase contrast microscope according to the present invention.

Referring to FIG. 6, a phase contrast microscope 20 in accordance with the present invention is described. Those elements making up phase microscope 20 that are common with phase microscope 10 are given the same reference numbers and symbols. In addition, only the differences between the microscopes are described.

Figure 1:
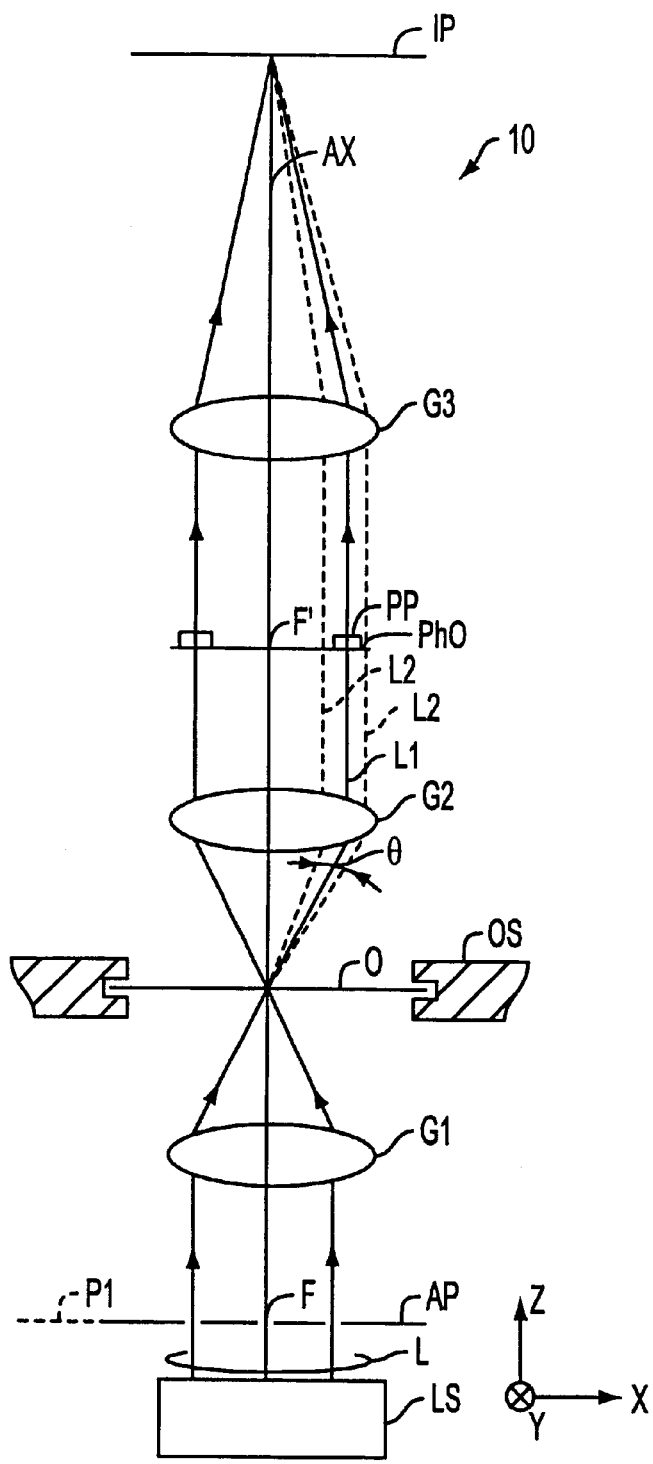
FIG. 1 is a schematic optical diagram of a prior art phase contrast microscope.
Figure 3:
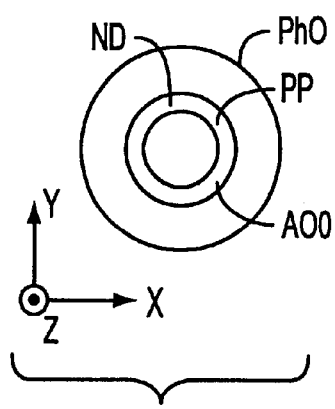
FIG. 3 is a plan view of a prior art phase filter for use with the microscope of FIG. 1.
Figure 2:
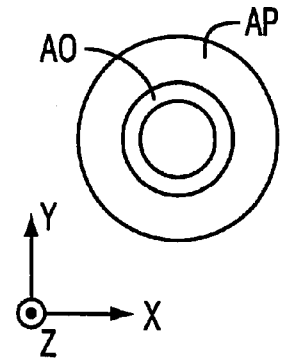
FIG. 2 is a plan view of a prior art aperture for use in combination with the phase aperture of FIG. 3 in the microscope of FIG. 1.
Figure 4:
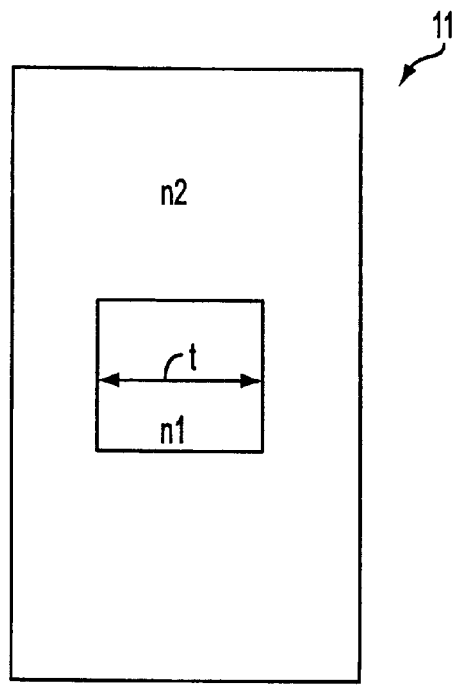
FIG. 4 is an exemplary phase object of the kind that may be viewed with the microscope of FIG. 1, or with the microscope of the present invention.
Figure 5:
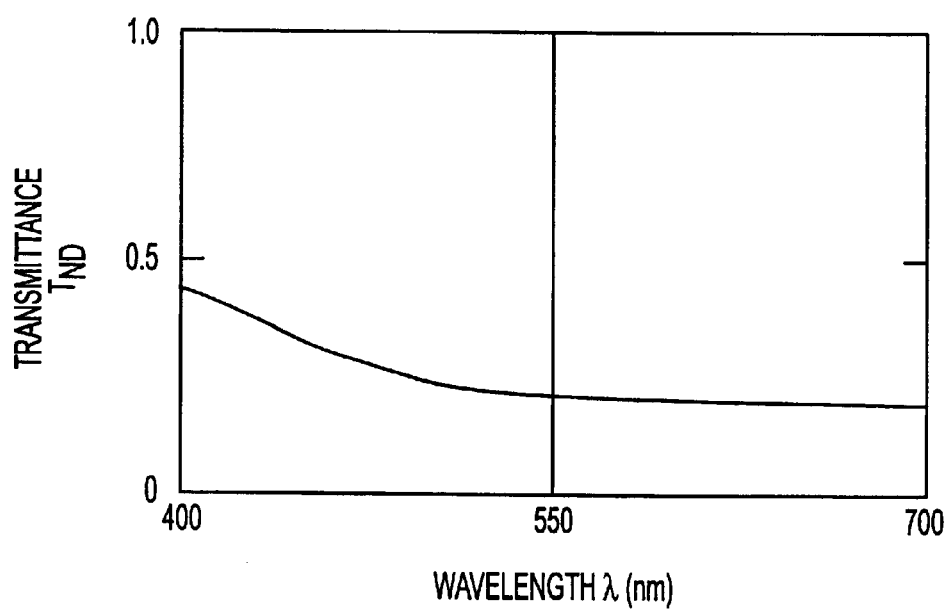
FIG. 5 is an exemplary plot of the transmission $T_{ND}$ vs. wavelength $\lambda$ (nm) for the prior art phase aperture of FIG. 3.

The operation of the microscope 20 similar to that of the microscope 10. That is, illumination light L having a wavelength $\lambda$ is emitted from light source LS and passes through an annular opening AO in a ring aperture AP. By using objective lenses G2 and G3, the light transmitted through object O is concentrated at image plane IP, where an image of the object is formed. A phase aperture Phn is arranged at the rear focal point F' of the objective lens G2. The phase aperture Phn is conjugate with ring aperture AP. The phase aperture Phn has an opening similar to aperture opening AO of ring aperture AP (FIG. 2), which may be annular, as shown, or some other desired shape. The phase aperture Phn also has a phase-modulation means, such as phase plate PP, which provides a phase difference of a quarter wavelength to the transmitted light. A neutral-density filter ND may also be included on phase plate PP, as discussed above in connection with aperture plate PhO. Described below are phase apertures Phn (i.e., Ph1–Ph4) of the present invention suitable for use with the microscope 20.

First Embodiment

Figure 7:
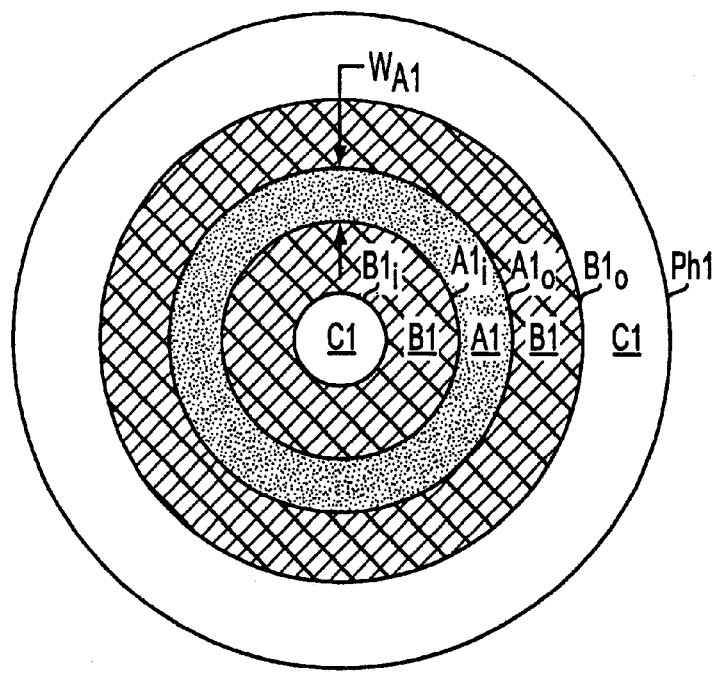
FIG. 7 is a plan view of a phase aperture according to a first embodiment of the present invention, suitable for use in the phase contrast microscope of FIG. 6.

With reference now to FIG. 7, phase aperture Ph1 has transmittance-modulation annular portions A1 and B1 having respective widths of $W_{A1}$ and $W_{B1}$, and composed of neutral density film. Surrounds B1 surronds both, the inner- and outer-peripheries A1i and A1o of portion A1. Portions A1 and B1 correspond to first and second transmittance-modulation portions respectively. The phase plate Ph1 has a no-modulation portion C1 surrounding B1 on both the inner- and outer-peripheries B1i and B1o of portion B1.

Portion A1 has a similar shape, at a given magnification, to aperture opening AO of ring aperture AP. It is desirable that the given magnification of microscope 20 be set to be a combined magnification of a condenser lens G1 and an objective lens G2 such that ring aperture AP can be relayed by lenses G1 and G2 to the phase aperture Ph1. It is more desirable that the width $W_{A1}$ of portion A1 be set slightly wider than the width determined by the combined magnification with respect to aperture opening AO, to facilitate adjustment of the position of phase aperture Ph1. Portion B1 is provided at inner- and outer-peripheries A1i and A1o of portion A1 such that portion B1 surrounds the periphery of portion A1. It is desirable that width $W_{B1}$ of portion B1 is the same, or slightly wider, than width $W_{A1}$, but the invention is not limited to this construction. Moreover, no-modulation portion C1 surrounds portion B1. Portions A1 and B1 preferably have an annular shape in either case.

Use of a neutral density film controls the transmittance such that the transmittance TA1 of portion A1 is about 0.2 and the transmittance TB1 of the portion B1 is about 0.5. Portion C1 of the phase aperture Ph1 does not have a transmittance-modulation film, and thus has a transmittance TC1 of 1.

In other words, phase aperture Ph1 comprises, radially outwardly from its center, a first circular portion C1 having a transmittance of 1, a second annular portion B1 having a first transmittance, a third annular portion A1 having a second transmittance, a fourth annular portion, also B1, having the first transmittance, and a fifth annular portion, also C1, having a transmittance of 1.

Referring to FIG. 6, the principle of the phase contrast observation using phase aperture Ph1 in phase contrast microscope 20 is now explained. The explanation below also applies in a general sense to the phase apertures of the present invention as set forth below. Diffraction angle θ of diffracted light L2 produced by the structure (not shown) of object O can be expressed in the following equation, where the wavelength is λ, the refractive index of the medium is n, and the period of the structure of the object is t:

$$\theta = \sin^{-1}(0.61\lambda/n \cdot t), \qquad (1)$$

wherein θ is limited to the range $0 \leq \theta \leq \pi/4$.

Where object O comprises a biological specimen, the amount of phase difference of the object is generally approximately proportional to the dimension of the structure of the object, so that an object having large amount of phase difference usually has a large structure. In other words, it is characteristic that t in the equation (1) immediately above is large. In equation (1), if n and λ are constant, θ becomes small.

Accordingly, the distance P perpendicular to axis AX between diffracted light L2 and direct light L1 can be expressed as:

$$P = f2 \cdot \sin \theta, \qquad (2)$$

wherein f2 is the focal length of objective lens G2, and θ is the diffraction angle.

When an object having a large amount of phase difference (i.e., a large structured object) is observed, diffraction angle θ is small, and the intensity of the diffracted light is relatively large. Therefore, distance P between direct light L1 and diffracted light L2 becomes small, so that the direct light L1 and the $\pm 1^{st}$ order diffracted light L2 are passed through portions A1 and B1, respectively. Accordingly, the ratio of the transmittance TA1=0.2 of portion A1 to the transmittance TB1=0.5 of portion B1 is the essential amount of the modulation of transmittance between direct light L1 and diffracted light L2. Thus, low-contrast type imaging results.

On the other hand, when an object having small amount of phase difference (i.e., a small structured object) is observed, diffraction angle θ is large, and the intensity of the diffracted light is relatively weak. Therefore, direct light L1 and the $\pm 1^{st}$ order diffracted light L2 are passed through portions A1 and C1, respectively. Accordingly, the ratio of the transmittance TA1=0.2 of portion A1 to the transmittance TC1=1 of portion C1 becomes substantially the value of the modulation of transmittance between direct light L1 and diffracted light L2. So, the effect that the amplitude of only the direct light L1 can be decreased. Accordingly, high-contrast type imaging results.

In phase aperture Ph1, the transmittance varies step by step, from B1 to C1, relative to portion A1. So, the ratio of the amplitude (and consequently, the ratio of the light intensity) of direct light L1 relative to that of diffracted light L2 can be moderately adjusted. Preferably, this can be adjusted to be almost the same. Then, good image contrast can be observed.

Second Embodiment

Figure 8:
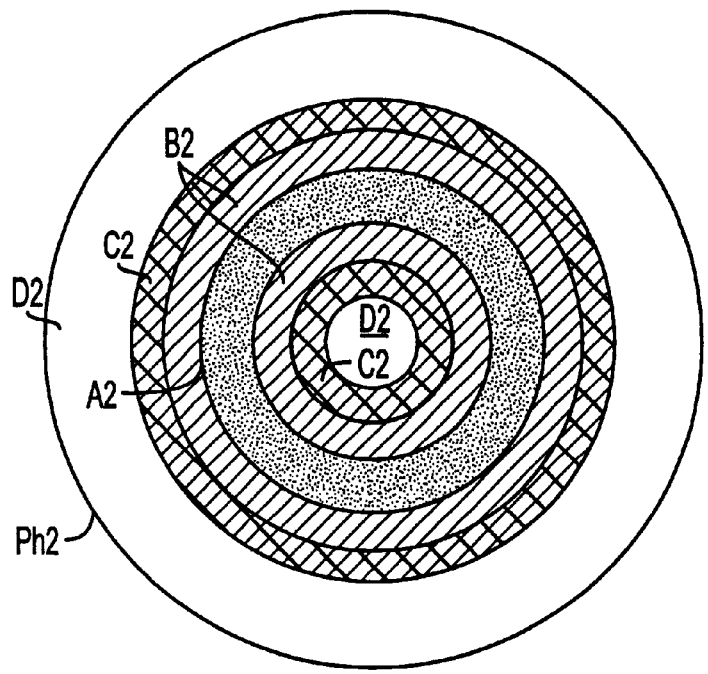
FIG. 8 is a plan view of a phase aperture according to a second embodiment of the present invention, suitable for use in the phase contrast microscope of FIG. 6.

With reference now to FIG. 8, a phase aperture Ph2 in accordance with to a second embodiment of the present invention is described. The phase aperture Ph2 comprises a transmittance-modulation portion A2 with a transmittance TA2=0.2 having a ring shape, a transmittance-modulation portion B2 with a transmittance TB2=0.5 located symmetrically with portion A2, a transmittance-modulation portion C2 with a transmittance TC2=0.8, and no-modulation portion D2 with a transmittance of 1. As can be seen from FIG. 8, the phase aperture Ph2 is constructed such that portion B2 surrounds portion A2, portion C2 surrounds portion B2 and portion D2 surrounds portion C2. The central section of portion D2 is circular. Portions A2, B2, and C2 are all annular shaped. Portion A2 corresponds to a first transmittance-modulation portion and portions B2 and C2 correspond to a second transmittance-modulation portion.

In other words, the phase aperture Ph2 comprises, radially outwardly from its center, a first circular portion D2 having a transmittance of 1, a first annular portion C2 having a first transmittance, a second annular portion B2 having a second transmittance, a third annular portion A2 having a third transmittance, a fourth annular portion, also B2, having the second transmittance, a fifth annular portion, also C2, having the first transmittance, and a seventh annular portion, also D2, having a transmittance of 1. According to this construction, the transmittance of portions B2 and C2 relative to portion A2 is radially graded with finer steps than that of phase aperture Ph1, so that an image having better contrast can be observed.

Third Embodiment

Figure 9:
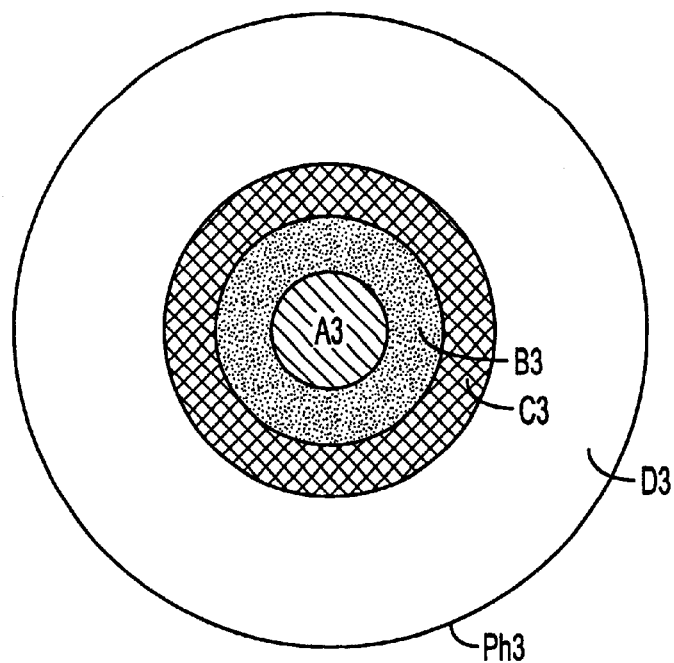
FIG. 9 is a plan view of a phase aperture according to a third embodiment of the present invention, suitable for use in the phase contrast microscope of FIG. 6.

With reference to FIG. 9, phase aperture Ph3 representing a third embodiment of the present invention is described. Aperture AP is used with a phase aperture Ph3 in microscope 20 and has a circular aperture opening AO instead of an annular aperture. Phase aperture Ph3 comprises a circular transmittance-modulation portion A3 with a transmittance TA3=0.2, an annular transmittance-modulation portion B3 with a transmittance TB=0.5, an annular transmittance-modulation portion C3 with a transmittance=0.8, and an annular no-modulation portion D3 with a transmittance of 1. Portion A3 corresponds to a first transmittance-modulation portion and portions B3 and C3 correspond to a second transmittance-modulation portion. As can be seen from FIG. 9, phase aperture Ph3 is constructed such that portion B3 surrounds portion A3, portion C3 surrounds portion B3 and portion D3 surrounds portion C3.

In other words, phase aperture Ph3 comprises, radially outwardly from its center, a first circular portion A3 having a first transmittance<1, a first annular portion B3 having a second transmittance, a third annular portion C3 having a third transmittance, and a fourth annular portion D3 having a transmittance of 1.

Fourth Embodiment

Figure 10:
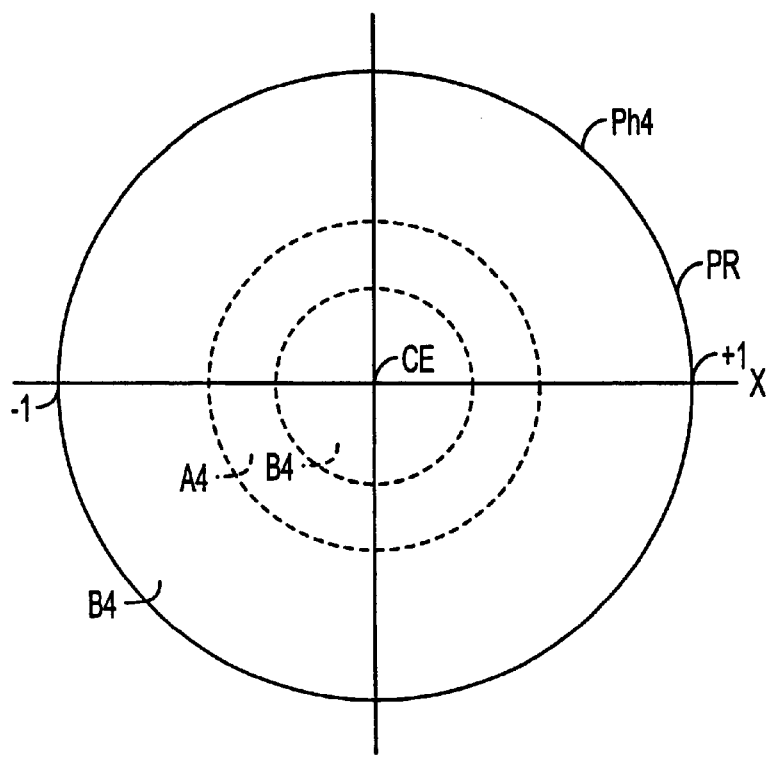
FIG. 10 is a plan view of a phase aperture according to a fourth embodiment of the present invention, suitable for use in the phase contrast micrcope of FIG. 6.
Figure 11:
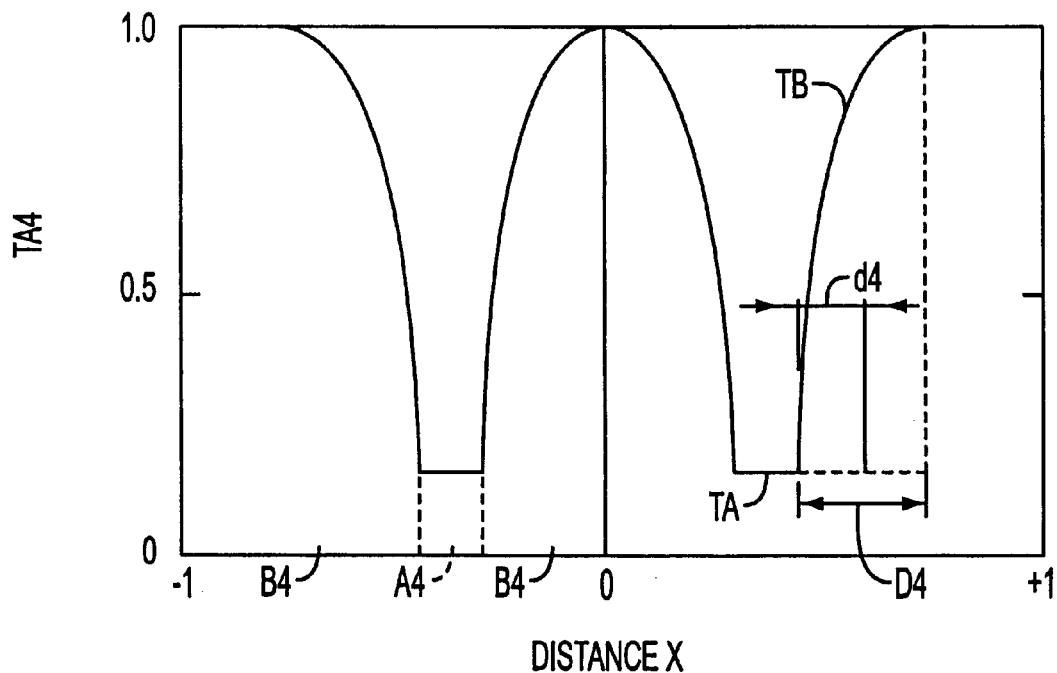
FIG. 11 illustrates the transmittance profile (T vs. x) of the phase aperture of FIG. 10.

With reference now to FIGS. 10 and 11, a phase aperture Ph4 in accordance with to a fourth embodiment of the present invention is described. The phase aperture Ph4 has transmittence-modulation regions A4 and B4. The transmittance of these regions are described by the transmittance variation curve (i.e., transmission profile T vs. x) of FIG. 11. In FIG. 11, the horizontal X axis is the distance from optical axis AX, normalized to an outer-most periphery PR=1. The vertical axis is the transmittance. The transmittance of portion B4 of phase aperture Ph4 decreases continuously from center CE outwardly to portion A4 and then increases continuously relative to portion A4 from portion A4 outwardly to periphery PR. The transmittance-modulation portions A4 and B4 correspond to a first and a second transmittance-modulation portions, respectively.

Preferably, it is desirable that the transmittance-variation curve satisfies with the following equation:

$$TA4+(1-TA4) \times d4/D4 < TB4 < 1 \quad (3)$$

where TA4 is the transmittance of portion A4, TB4 is the transmittance of portion B4, D4 is the width of portion B4, and d4 is the distance toward periphery PR from portion A4. An image having better contrast can be obtained by satisfying the equation.

Moreover, it is desirable for this embodiment to satisfy following equation:

$$TA4 < 0.3 \quad (4)$$

By satisfying equation (4), an image of an object even having small phase difference can be obtained with better contrast.

Fifth Embodiment

Referring to FIG. 7 and phase aperture Ph1, a fifth embodiment of the present invention is described.

Figure 12:
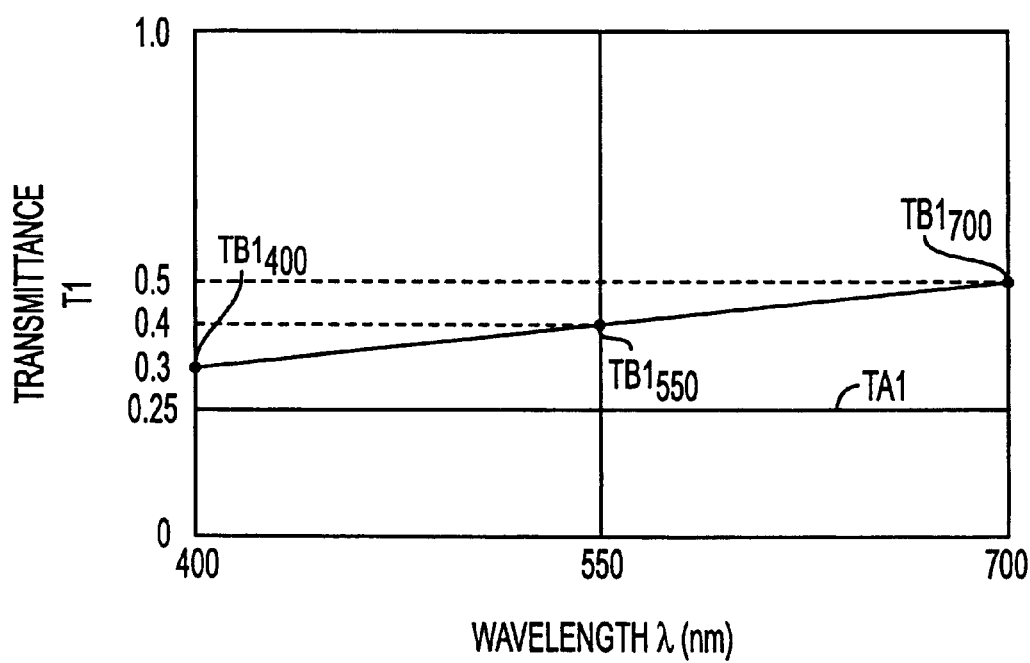
FIG. 12 is a plot of the spectral transmittance (T vs. $\lambda$ (nm)) of the phase aperture of FIG. 11.

In phase aperture Ph1, the transmittance TA1 of portion A1 is set to be about 0.25 over the range of the visible wavelength, 400 nm through 700 nm. Use of a neutral density film or the like controls transmittance TB1 of portion B1 such that the transmittance $TB1_{400}$ at wavelength of 400 nm is 0.3, the transmittance $TB1_{550}$ at a wavelength of 550 nm is 0.4, and the transmittance $TB1_{700}$ at a wavelength of 700 nm is 0.5. Referring to FIG. 12, the transmittance T1 within the scope of the wavelength 400 nm through 700 nm almost varies along the straight line passing through the points $TB1_{400}$, $TB1_{550}$, and $TB1_{700}$.

Sixth Embodiment

Figure 13:
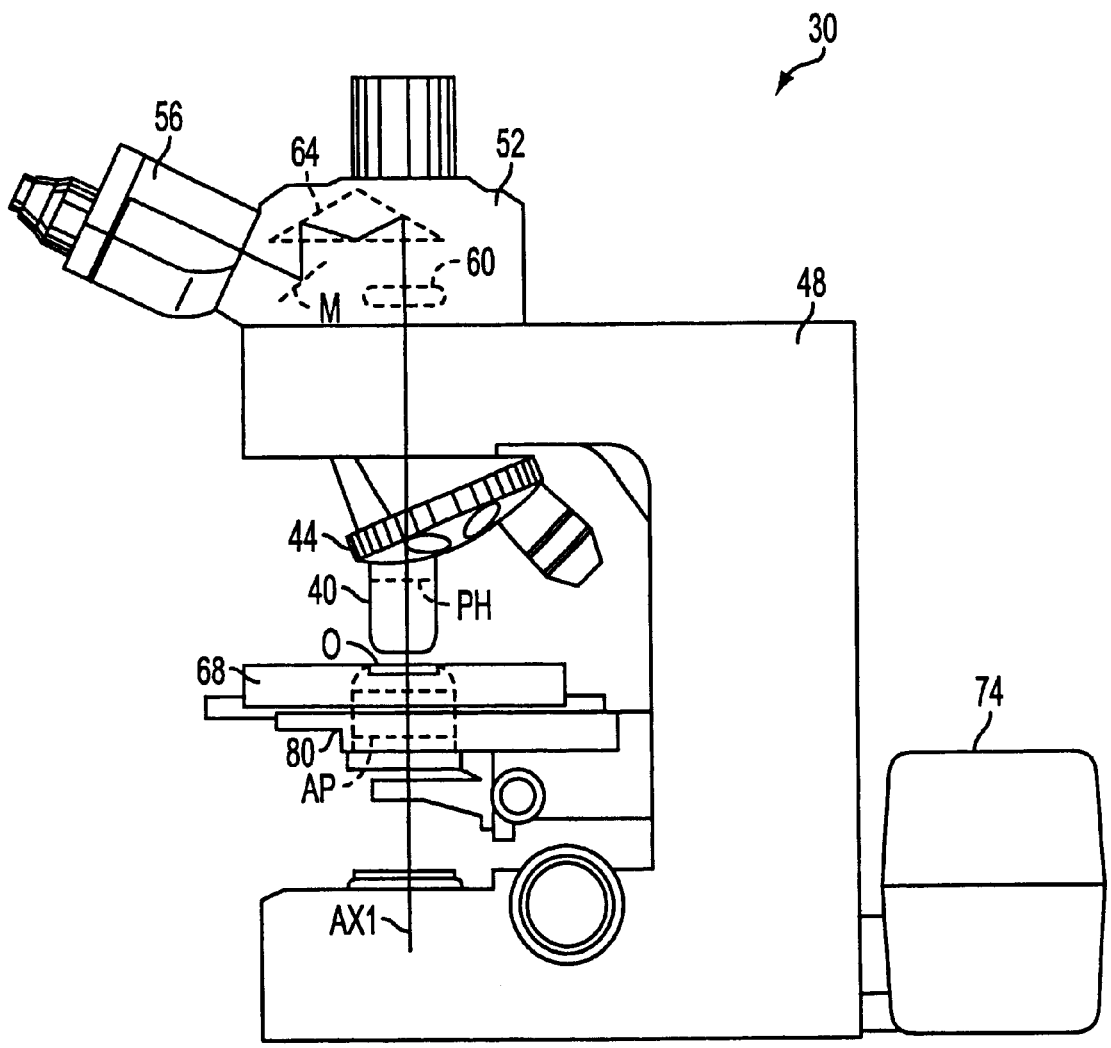
FIG. 13 illustrates a construction of a phase contrast microscope according to a sixth embodiment of the present invention.
Figure 14:
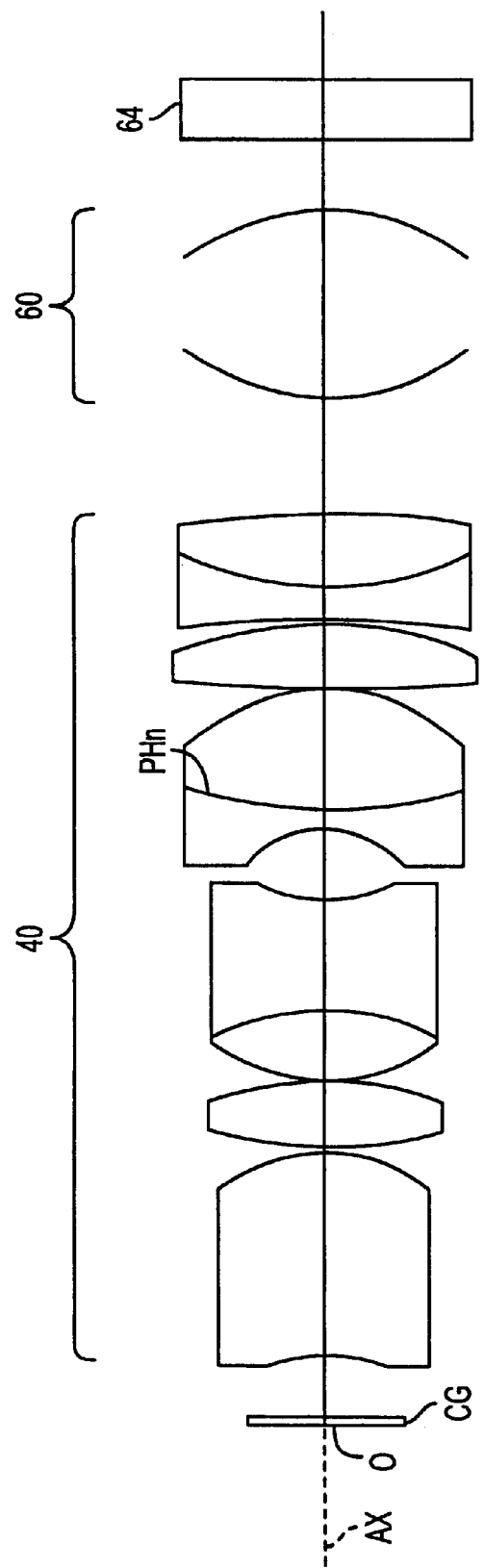
FIG. 14 is a schematic optical diagram of an objective lens of the phase contrast microscope shown in FIG. 13.

FIG. 13 illustrates a construction of a phase contrast microscope 30 in accordance with a sixth embodiment of the present invention. An objective lens 40 is fitted to a revolver assembly 44 and is disposed in an observation optical path along an optical axis AX1. The revolver assembly 44 is detachably fitted to a base 48, which serves as the main body of microscope 30. A body tube 52 is mounted on the base 48. An eyepiece holder 56 for storing an eyepiece through which an image of a specimen is visually observed, is fitted on body tube 52. Inside of body tube 52, as shown by dotted line, is contained an imaging lens 60, which converges the passing through objective lens 40, and forms the image of the specimen. Also inside body tube 52 is a prism 64 and a mirror M, which leads the light passing through imaging lens 60 to eyepiece holder 56. A stage 68, on which a specimen (object) O is placed, and an illumination unit 74 providing light to illuminate the specimen, are fitted to base 48. The light provided by illumination unit 74 illuminates specimen O placed on stage 68 through a condenser lens 80, thereby providing a transmitted illumination. A phase aperture Phn (e.g., one of phase apertures Ph1–Ph4) is arranged inside of objective lens 40. Ring aperture AP is placed at a position conjugate with phase aperture Phn.

Lens specifications of objective lens 40 are set forth in Table 1, below. In Table 1, a cover glass CG, imaging lens 60, and prism 64 are included. Also, the numerical aperture of objective lens 40 at the specimen O side is NA, the focal length of objective lens 40 is F, the curvature of radius of the respective lens surface is r, the distance between adjacent lens surfaces is d, and the refractive index and the Abbe number with respect to d-line light (587.6 nm) of the lens are $n_d$ and $v_d$, respectively. Also, the first column lists lens surfaces S (from the specimen side) and the focal length of imaging lens 60 is fI. Phase aperture Phn is formed at the eleventh surface of objective lens 40 by vacuum evaporation. The characteristic of phase aperture Phn is that of the third embodiment, i.e., phase aperture Ph3.

TABLE 1

| S | r (mm) | d (mm) | $n_d$ | $v_d$ |
|---|---|---|---|---|
| cover glass | | | | |
| 1 | ∞ | 0.17 | 1.5222 | 58.80 |
| 2 | ∞ | 4.20 | | |
| objective lens 40 | | | | |
| 3 | −10.059 | 13.29 | 1.8041 | 46.54 |
| 4 | −13.053 | 0.30 | | |
| 5 | 23.466 | 4.50 | 1.4978 | 82.52 |
| 6 | −19.900 | 0.20 | | |
| 7 | 15.451 | 4.27 | 1.4339 | 95.57 |
| 8 | −16.087 | 7.25 | 1.6727 | 32.17 |
| 9 | 11.863 | 4.70 | | |
| 10 | −7.017 | 1.65 | 1.6127 | 44.41 |
| 11 | 94.422 | 7.00 | 1.5932 | 67.87 |
| 12 | −12.305 | 0.20 | | |
| 13 | 209.577 | 4.20 | 1.7408 | 27.63 |
| 14 | −24.512 | 0.50 | | |
| 15 | −49.165 | 2.00 | 1.7440 | 45.00 |
| 16 | 22.005 | 5.00 | 1.4978 | 82.52 |
| 17 | −50.715 | 100.00 | | |
| imaging lens 60 | | | | |
| 18 | 75.043 | 5.10 | 1.6228 | 57.03 |
| 19 | −75.043 | 2.00 | 1.7495 | 35.19 |
| 20 | 1600.580 | 7.50 | | |
| 21 | 50.256 | 5.10 | 1.6676 | 41.96 |
| 22 | −84.541 | 1.80 | 1.6127 | 44.41 |
| 23 | 36.911 | 10.00 | | |
| prism 64 | | | | |
| 24 | ∞ | 30.00 | 1.5688 | 56.04 |
| 25 | ∞ | 139.31 | | |

NA=0.45, F=20.0, fI=200

When the phase difference is set between the direct light and the diffracted light in the phase contrast observation device of the present invention, either the bright contrast or dark contrast method can be applied. In the dark contrast method, the phase difference of the direct light is advanced by a quarter of the wavelength such that the object having a higher refractive index than surrounding medium is seen darker. In, the bright contrast method, the phase difference of the direct light is delayed by a quarter of the wavelength such that the object having a higher refractive index than surrounding medium is seen brighter.

According to the phase contrast observation device of the present invention explained above, when an object having a large amount of phase difference is observed, it is possible to obtain a low-halo image, without the help of an electrical-contrast-modulation device. Moreover, when an object having a small amount of phase difference is observed, it is possible to obtain a high-contrast image. Therefore, it is always possible to obtain a good-contrast image, regardless of the amount of phase difference produced by the object.

While the present invention has been described in connection with working examples and various embodiments, it will be understood that it is not so limited. On the contrary, the present invention is intended to cover all alternatives, modifications, and equivalents as may be included within the spirit and scope of the invention as defined in the appended claims.

What is claimed is:

1. A phase contrast observation device for observing an object, comprising along an optical axis:
   a light source capable of providing light;
   an illumination optical system condensing the light from said light source and illuminating the object;
   an aperture stop having an aperture therein, arranged in said illumination optical system;
   an objective lens for converging light from the illuminated object and forming an image of the object; and
   a phase-modulation member arranged at a position inside said objective lens at a position conjugate to said aperture stop, said member having a first transmittance-modulation portion formed at a portion corresponding to said aperture of said aperture stop, and a second transmittance-modulation portion formed surrounding an inside and outside of the first transmittance-modulation portion,
   wherein said first and second transmittance-modulation portions have first and second transmittances TA and TB, respectively, satisfying the following condition: TA<TB.

2. The phase contrast observation device according to claim 1, satisfying the following condition:

$TA<0.30$.

3. The phase contrast observation device according to claim 1, wherein said aperture and said first transmittance-modulation portion have an annular shape.

4. The phase contrast observation device according to claim 1, satisfying the following conditions:

$TA<TB$ and $TA<0.30$.

5. A phase contrast observation device for observing an object, comprising along an optical axis:
   a light source capable of providing light;
   an illumination optical system condensing the light from said light source and illuminating the object;
   an aperture stop having an aperture therein, arranged in said illumination optical system;
   an objective lens for converging light from the illuminated object and forming an image of the object; and
   a phase-modulation member arranged at a position inside said objective lens at a position conjugate to said aperture stop, said member having a first transmittance-modulation portion formed at a portion corresponding to said aperture of said aperture stop, and a second transmittance-modulation portion formed symmetrically on both sides of the first transmittance-modulation portion,
   wherein said first and second transmittance-modulation portions have first and second transmittances TA and TB, respectively, satisfying the following condition: TA<TB, and
   wherein said second transmittance-modulation portion comprises transmittances TB400, TB500, and TB700, with respect to wavelengths of 400 nm, 550 nm, and 700 nm, respectively, satisfying the following condition: TB400<TB550<TB700.

6. An objective lens, for use in phase contrast device, comprising:
   a plurality of lenses forming an image of an object; and
   a phase-modulation member arranged at a position, inside of said plurality of lenses and at a position conjugate to an aperture stop having an aperture therein, said member having a first transmittance-modulation portion formed at a portion corresponding to said aperture of said aperture stop, and a second transmittance-modulation portion formed surrounding an inside and outside of the first transmittance-modulation portion,
   wherein said first and second transmittance-modulation portions have first and second transmittances TA and TB, respectively, satisfying the following condition: TA<TB.

7. The objective lens according to claim 6, satisfying the following condition:

$TA<0.30$.

8. The objective lens according to claim 6, wherein said aperture and said first transmittance-modulation portion have an annular shape.

9. The objective lens according to claim 6, satisfying the following conditions:

$TA<TB$ and $TA<0.30$.

10. An objective lens, for use in phase contrast device, comprising:
    a plurality of lenses forming an image of an object; and
    a phase-modulation member arranged at a position, inside of said plurality of lenses and at a position conjugate to an aperture stop having an aperture therein, said member having a first transmittance-modulation portion formed at a portion corresponding to said aperture of said aperture stop, and a second transmittance-modulation portion formed symmetrically on both sides of the first transmittance-modulation portion,
    wherein said first and second transmittance-modulation portions have first and second transmittances TA and TB, respectively, satisfying the following condition: TA<TB, and
    wherein said second transmittance-modulation portion comprises transmittances TB400, TB500, and TB700, with respect to wavelengths of 400 nm, 550 nm, and 700 nm, respectively, satisfying the following condition: TB400<TB550<TB700.

11. An objective lens, for use in phase contrast device, comprising:

a plurality of lenses forming an image of an object; and a phase-modulation member arranged at a position, inside of said plurality of lenses and at a position conjugate to an aperture stop having an aperture therein, said member having a first transmittance-modulation portion formed at a portion corresponding to said aperture of said aperture stop, and a second transmittance-modulation portion formed symmetrically on both sides of the first transmittance-modulation portion, wherein said first and second transmittance-modulation portions have first and second transmittances TA and TB, respectively, satisfying the following condition: TA<TB, and satisfying the following condition:

$$TA+(1.0-TA)Xd/D<TB<1.0$$

wherein d is a distance between said first transmittance-modulation portion and said second transmittance-modulation portion, and D is a width of said second transmittance-modulation portion.

* * * * *